July 29, 1941.   C. ADAMOLI   2,250,850
BERYLLIUM ALLOY
Filed Nov. 5, 1937   8 Sheets-Sheet 1

INVENTOR
Carlo Adamoli

INVENTOR
Carlo Adamoli

INVENTOR
Carlo Adamoli

INVENTOR
Carlo Adamoli

July 29, 1941.  C. ADAMOLI  2,250,850
BERYLLIUM ALLOY
Filed Nov. 5, 1937  8 Sheets-Sheet 7

INVENTOR
Carlo Adamoli

Fig. 15

Patented July 29, 1941

2,250,850

UNITED STATES PATENT OFFICE 2,250,850

BERYLLIUM ALLOY

Carlo Adamoli, Milan, Italy, assignor to Perosa Corporation, Wilmington, Del., a corporation of Delaware Application November 5, 1937, Serial No. 172,871
In Italy June 30, 1937

4 Claims. (Cl. 148—32)

This invention relates to beryllium alloys.

The applicant has studied the ternary alloys comprising beryllium alloyed to a basis metal and to another metallic substance added in slightly high proportions and has discovered that if to a basis metal which crystallises in a certain system, a certain proportion of a metallic substance crystallising in a system of the same order, and beryllium are alloyed, it is possible to obtain finally an alloy of the basis metal, beryllium and the metallic substance, possessing a very marked homogeneity and remarkable physical properties affording the possibility of industrial application, particularly when the alloy has been subjected to certain physical treatments.

Thus the applicant discovered that if a basis metal such as for example copper or nickel is alloyed to beryllium in a proportion consisting of in general between about 1.3% and 2.6% with addition in the first case of vanadium, and in the second molybdenum, in a minimum proportion of 0.1%, in practice preferably at least 0.2%, starting from which the additional metal induces a rapid and practically complete solubilisation of beryllium and the reciprocal interpenetration of the basis metal and beryllium, keeping always below contents of additional metals which would have a prejudicial effect, alloys are obtained which are very homogeneous and possess particular properties such as great hardness, with a high resistance to breaking and a remarkable tenacity, as well as an electrical conductivity high in comparison with that of known binary alloys of beryllium with one or the other basis metals mentioned above. It has been found that these properties are further increased by treatments, for example tempering and annealing, carried out under certain conditions.

It appears that the additional metallic substance, for example vanadium for copper and molybdenum for nickel, plays the part of a diffusing, homogenising or solubilising agent for the beryllium or for the definite compounds which may be formed. This theory appears to find justification in the works of the authors quoted above. It would appear notably that the geometrical crystalline structure corresponds, in certain alloys, above all when they have been subjected to such treatments as indicated above, to the geometrical crystalline structure of the basis metal.

The studies made by the applicant led to ascertain that the basis metals possessing a chemical and crystallographic analogy which is exhibited by nickel, copper, iron, aluminium, silver, and so on, are suitable for the constitution of the alloys of the type mentioned above.

It has likewise been shown that the metallic substances suitable for playing the part of diffusing, homogenising and solubilising agents are the metallic substances more capable of oxidation than the basis metal to which they are to be alloyed, and which show, in comparison to the basis metal, an analogy from the point of view of their crystalline system and the dimensions of the crystalline structure.

The present invention accordingly consists in forming alloys (a) from a metal as base such as copper, nickel, iron, aluminium, or other metal exhibiting a chemical and crystallographic analogy therewith; (b) from beryllium in a proportion small, particularly 1.3% to 2.6%, in comparison with the total weight of the alloy; and (c) from a metallic substance acting as a diffusing, homogenising and solubilising agent for beryllium, such as vanadium, molybdenum, tungsten, tantalum, uranium and titanium (which up to now has only been used for partially replacing the beryllium), chromium or other metallic substances having a crystallographic analogy with the basis metal, these metallic substances being present in a minimum proportion of 0.1% in practice preferably at least 0.2%, without however exceeding the proportion found experimentally which would have a prejudicial effect.

The invention consists in addition in improving the qualities of the alloys by subjecting the latter to a treatment or treatments comprising for example the operations of tempering and annealing or magnetic or electrical treatment, which enhance the diffusion of beryllium or its definite metallic compounds, and in consequence the homogeneity of the alloy.

The invention has finally as its object the alloys above in the state both before and after treatment, and also all objects manufactured by means of the said alloys, whether or not these objects have been subjected to the aforesaid physical treatments.

The alloys according to the invention afford a considerable technical progress in the manufacture of springs, needles and all other objects or articles which necessitate notably a maximum of elasticity even under very high mechanical stress with a great hardness and also a greatly reduced oxidisability and a considerable facility for manufacture without appreciable oxidation.

Notably, alloys are obtained, for example with copper or nickel as a base, which possess a very high mechanical resistance whether in the cast or machined state. These alloys possess a very great hardness, and resistance to wear, and can thus be used, among other things, for ball or roller bearings, bearings-blocks springs, for example laminated springs, and the like.

The alloys according to the invention, for example the alloys Ni-Be-Mo and Cu-Be-Va possess extremely good mechanical and electrical properties, and take a good temper after heating at a temperature considerably lower than that required for the usual alloys of beryllium, which has the advantage of lessening and practically removing the risk of approaching the fusion temperature or the disintegration of the alloy. The metal acting as solubilising agent, for example vanadium incorporated with copper or molybdenum incorporated with nickel, has the effect in this respect of lowering the temperature necessary for the inter-solubilisation of the constituents of the alloy.

Alloys of beryllium have already been manufactured and used, for example nickel-beryllium alloys, for the manufacture of springs, needles or other very fine objects, but it has not been possible to avoid the risk, on account of the delicacy of these objects, of causing "burning" of the alloy during the operations of tempering. In the same way alloys of nickel-beryllium have been manufactured with the addition, in increased proportion, of another metal such as titanium, but the contents of beryllium and titanium were very considerable, and on account of this fact the alloys were very costly and very oxidisable, and also brittle. Titanium, being in fact, in all the known alloys, used for a partial replacement of beryllium, is always in excess of the quantity necessary for the utilisation considered here, and the excess of titanium has a prejudicial effect completely different from that of the metal solubilising agent used according to the invention.

The invention on the contrary allows of obtaining alloys which, in spite of the addition of beryllium and another metal in relatively very small proportions, display a hardness very much superior to that shown by known alloys. Thus for example the alloys Ni-Be-Mo have been shown to possess a Brinell hardness of nearly 500 with an annealing of about 550° C. while the known alloys of Ni-Be show at most a Brinell hardness of about 400 with an annealing at 550° C.

In the case of alloys according to the invention with a nickel base, the proportion of beryllium comprises between 1.3 and 2.6, but preferably between 1.4 and 1.7, and the proportion of molybdenum is preferably higher than 0.3% and even may be increased up to 1%.

In the case of alloys with a copper base, the proportion of beryllium being comprised between 1.3 and 2.6%, the proportion of vanadium comprises advantageously between 0.2 and 0.5%.

Apart from the basis metal, beryllium and the metal solubilising agent, the alloys may contain in addition varous elements in very small proportions; in particular, iron can be added in a proportion in any case less than 4%, in order to give the alloy a very high fluidity in casting. It is only in the case of conducting alloys that it is preferable to refrain from adding iron.

The alloys according to the invention, for example the alloys Cu-Be-Va, likewise display very greatly improved qualities, and even notably, for the conducting alloys a greatly improved electrical conductivity, when they have been subjected to physical treatments such as those mentioned above, for example the heat & processes of tempering and annealing which secure their perfect homogeneity.

For example, a known alloy consisting of copper, beryllium (2.19%) and iron (0.24%) tempered with water after heating to 810° C. and annealed at 275° C. for 6 hours displayed an electrical conductivity at 25° C. for 29.8% of that of pure copper at 25° C. and at 75° C. of 28.4% of that of pure copper at 75° C. On the contrary an alloy containing, besides the copper, 2.15% of beryllium and 0.21% of vanadium, and also 0.21% of iron, tempered with water after heating at 795° C. annealed at 300° C. for one hour and rapidly cooled, then re-annealed at 290° C. for 5 hours, displays an electrical conductivity at 25° C. of 32.8% of that of pure copper at 25° C. and at 75° C. of 30.6% of that of pure copper at 75° C.

In the case of alloys according to the invention with iron as a base, in order to obtain a very great hardness and strong tenacity, and also a marked resistance to the action of acids, beryllium is added to the iron in the proportion of 1% to 3% (in this particular case it can be as low as 0.2%) with a metal to give homogeneity and hardness such as Mn, Mo, Wo, Va, Cr, Ni, in the proportion of 0.2 to 0.3%. This alloy is then subjected to heating at a temperature of 800 to 1050° C. followed by a rapid cooling in water for example, then an annealing at a temperature of 300 to 450° C. for one to twelve hours, the treatment being if desired repeated.

In the case of alloys with an aluminum base containing beryllium, it is possible to obtain by using a metal solubilising agent, types of alloys having qualities of the same order or even better than those of the well known alloys of a base of Al and Mg. For example beryllium is added to the aluminium in the proportion of 1% to 3% (in this particular case it may also be as low as 0.2%) with a metal for producing homogeneity and hardness, such as copper, zinc or tantalum, in proportion normally higher than 0.8%; these alloys of Al may likewise contain without detriment Ni, Fe, Mn, in proportions varying between 0.2 and 2%. This alloy is subjected to heating at a temperature of 470–515° C. followed by a rapid cooling in water or in an air blast, then annealed at a temperature of 160 to 190° C. for one to ten hours, this treatment being if desired repeated.

The proportion of metal homogeniser can be increased in a number of cases well above that strictly necessary for obtaining the desired homogeneity, provided that it does not give rise in other ways to prejudicial effects. Thus for example in the case of alloys Al-Be the proportion of copper may be taken up to 10%, without endangering the homogeneity of the alloy.

In the drawings various diagrams corresponding to the characteristics of alloys according to the invention are given, more particularly the alloys with nickel and copper respectively as bases.

In these drawings.

Figure 1:
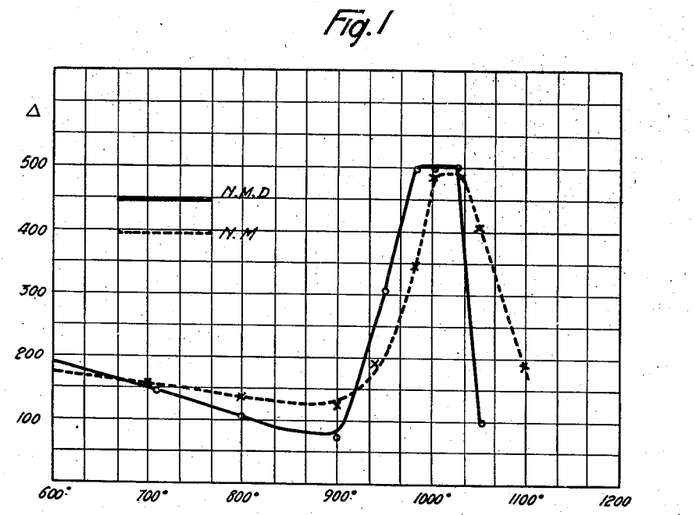
Fig. 1 is a diagram of the hardness curves for two alloys Ni-Be-Mo.

The mean curves of hardness, after tempering, which are represented in Fig. 1 correspond to the two following alloys:

Normal nickel-molybdenum alloy (referred to in the diagram by the abbreviation "N. M."):

|  | Per cent |
|---|---|
| Be | Between 1.4 and 1.6 |
| Mo | Between 0.3 and 0.5 |
| Ni | The remainder |

Hard nickel-molybdenum alloy (referred to in the diagram by the abbreviation "N. M. D.":

|  | Per cent |
|---|---|
| Be | More than 1.6 |
| Mo | Between 0.3 and 0.5 |
| Ni | The remainder |

These alloys were heated at 1000° C. for 45 minutes, tempered with water, then annealed at 485° C. for about 10 hours, in order to obtain harder alloys, or for 15 hours in order likewise to obtain greater tenacity. The variations in Brinell hardness (ordinates) are presented as a function of the temperature (abscissae).

Figure 2:
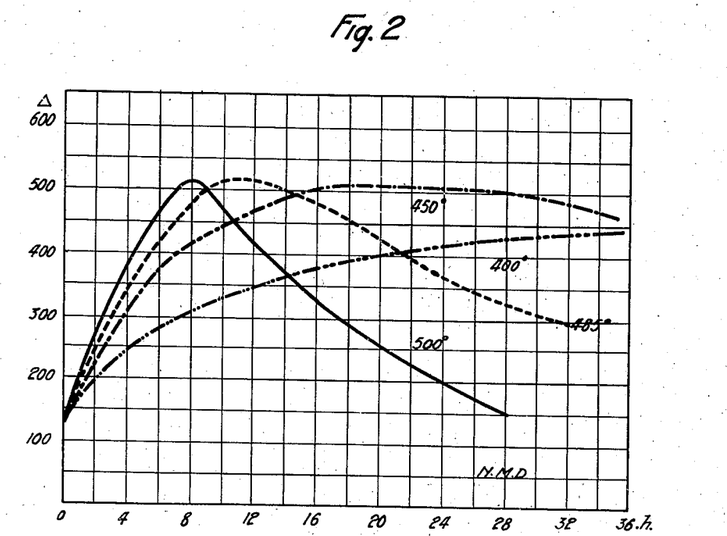
Figs. 2 and 3 are diagrams of hardness curves for each of the two alloys respectively, after treatment for tempering and annealing.
Figure 3:
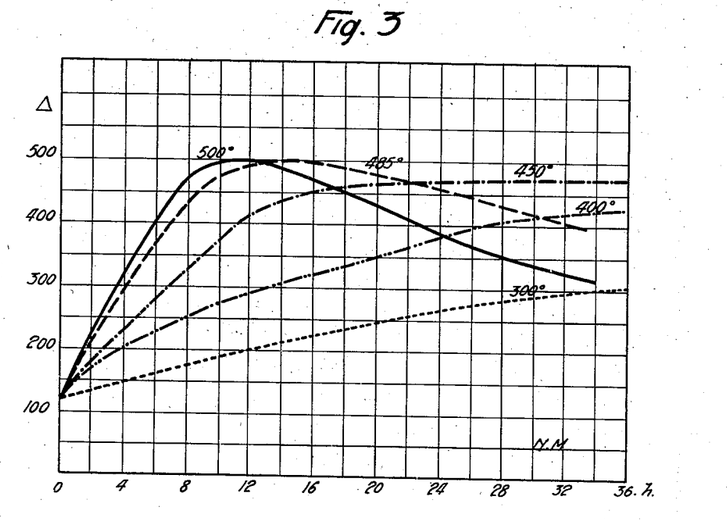

The mean curves of hardness in Figures 2 and 3 apply respectively to the two alloys above with nickel as base, referred to by the abbreviations "N. M. D." and "N. M." These curves give the variations in the hardness after annealing, for different temperatures, as a function of the duration of annealing shown in hours $h$ (abscissae).

Figure 4:
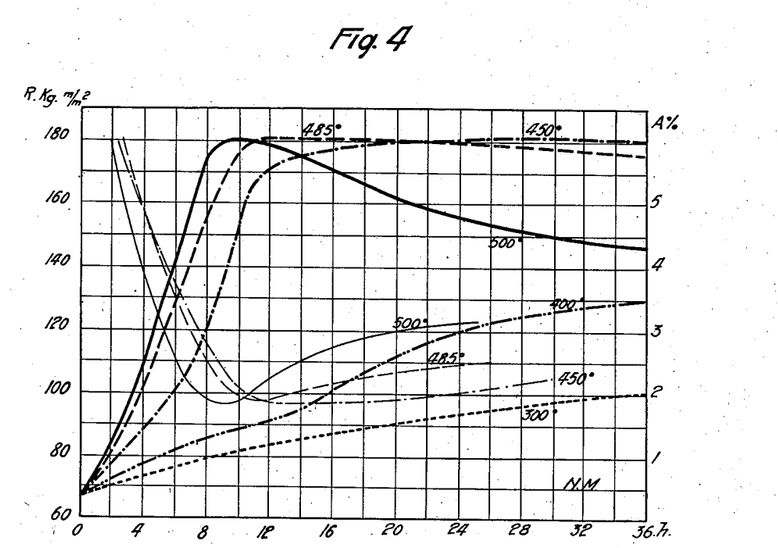
Fig. 4 is a diagram of curves of tensile strength of one of the alloys after annealing.

In Figure 4 for the alloy "N. M." the variations in elongation designated by "A%" (continuous and short lines) and the tensile strength corresponding to the breaking stress designated by "R" in kgs. per mm.$^2$ (broken and mixed lines) are shown for the various temperatures as a function of the duration of annealing, shown in hours $h$.

Figure 5:
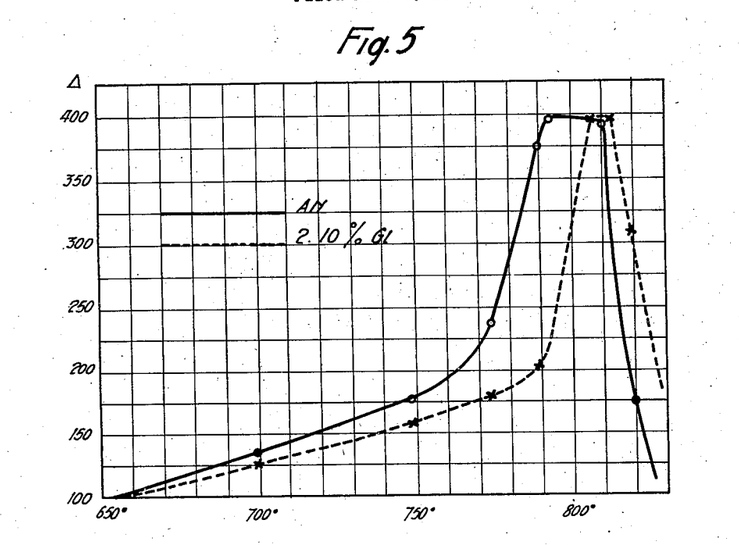
Fig. 5 is a diagram of the hardness curve of an alloy with copper as base as a function of the temperature of tempering.

In Figure 5 the curves for Brinell hardness obtained after tempering and annealing, are given as a function of the temperature of annealing, on the one hand for a known alloy with copper as base containing 2.10% of beryllium, the remainder being copper, and on the other hand, for an alloy with copper as base solubilised" according to the invention, containing a proportion of beryllium not exceeding 2% and 0.3% of vanadium, the remainder being copper; this last alloy Cu-Be-Va is designated in the drawing by the abbreviation "A. N." corresponding more particularly to the following composition:

|  | Per cent |
|---|---|
| Beryllium | Between 1.9 and 2.1 |
| Vanadium | Between 0.2 and 0.3 |
| Copper | The remainder |

The curves in Figure 5 give the greatest amplitude of variations possible for the corresponding temperature of annealing.

Figure 6:
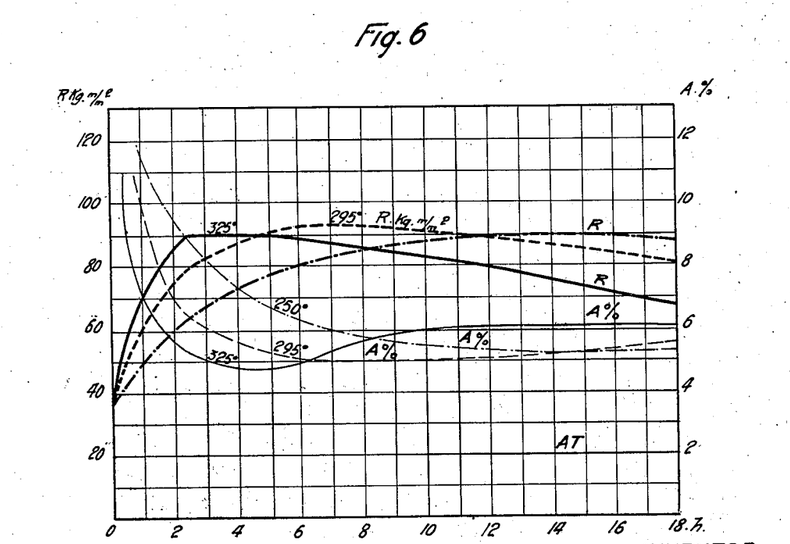
Figs. 6, 7 and 8 are diagrams of curves showing the characteristics (in particular elongation) as a function of the duration of annealing, for three different alloys with copper as base.

Figure 6 represents the curves giving the variations, as a function of the duration of annealing in hours $h$, of the tensile strength, designated by "R," in kgs. per mm.$^2$, and the elongation, designated by "A%," these curves corresponding to an alloy of copper-beryllium-vanadium which is a soft alloy, designated in the drawings by the abbreviation "A. T." having the following composition:

|  | Per cent |
|---|---|
| Beryllium | Between 1.6 and 1.8 |
| Vanadium | Between 0.2 and 0.3 |
| Copper | The remainder |

This alloy was tempered in water after heating at 795° C. for 15 minutes, then annealed at 295° C. for times varying from 15 minutes to eighteen hours.

Figure 7:
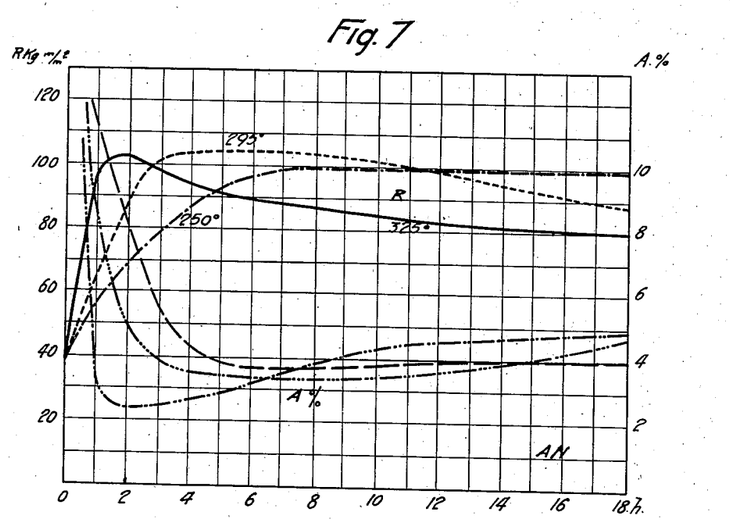

Figure 7 gives the corresponding curves which relate to the alloy copper-beryllium-vanadium, designated in the drawings by the abbreviation "A. N." and containing, as indicated above:

|  | Per cent |
|---|---|
| Beryllium | Between 1.9 and 2.1 |
| Vanadium | Between 0.2 and 0.3 |
| Copper | The remainder |

This alloy was tempered in water after heating at 785° C. for 20 minutes, then annealed at 295° C. for times varying from 15 minutes to eighteen hours.

Figure 8:
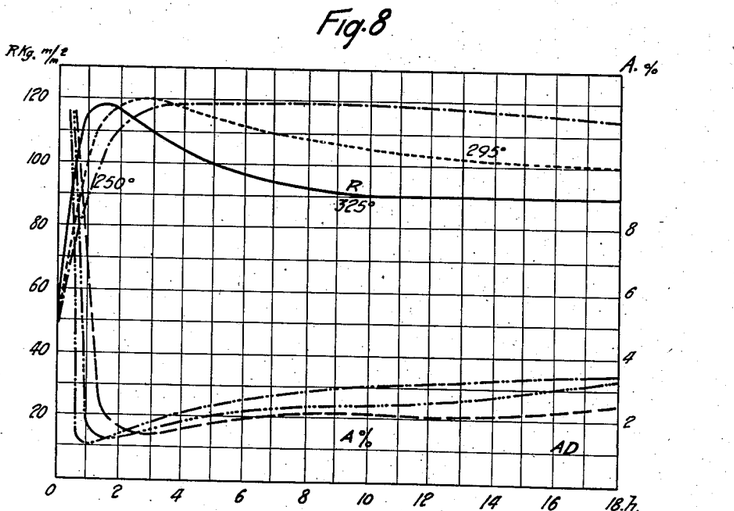

The corresponding curves in Figure 8 relate to the alloy copper-beryllium-vanadium, constituting a hard alloy, designated in the drawings by the abbreviation "A. D." containing:

|  | Per cent |
|---|---|
| Beryllium | Between 2.4 and 2.6 |
| Vanadium | Between 0.25 and 0.35 |
| Copper | The residue |

This alloy was tempered in water after heating at 780° C. for 20 minutes, then annealed at 295° C. for times varying from 15 minutes to eighteen hours.

Figure 9:
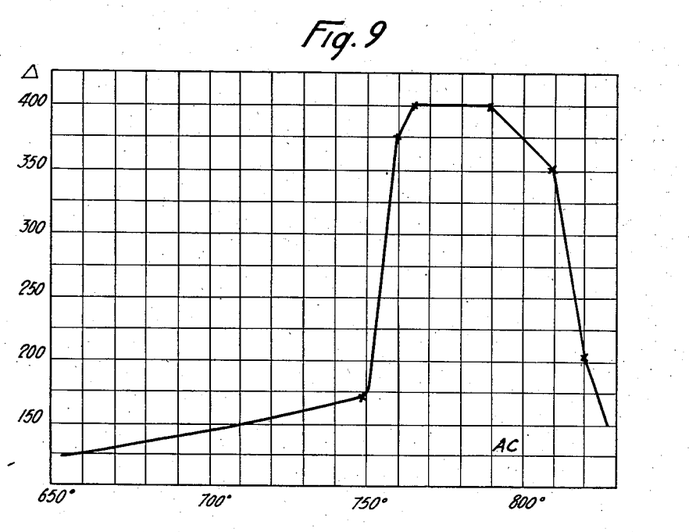
Fig. 9 is a diagram giving the hardness curve for a fourth alloy with copper as base as a function of the temperature of tempering.
Figure 10:
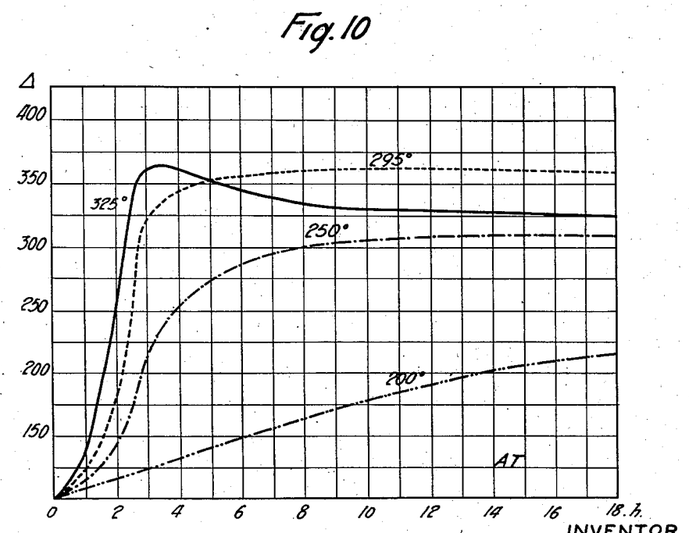
Figs. 10, 11, 12 and 13 are diagrams of hardness curves, as a function of the duration of annealing, for the four alloys in question with copper as base.
Figure 11:
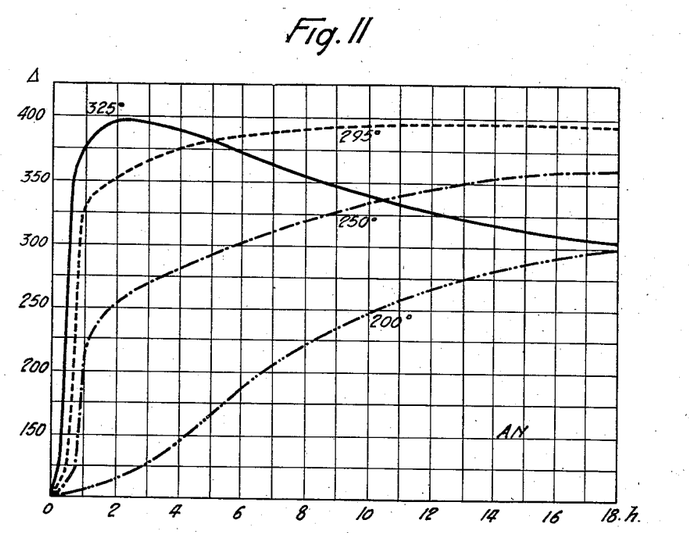
Figure 12:
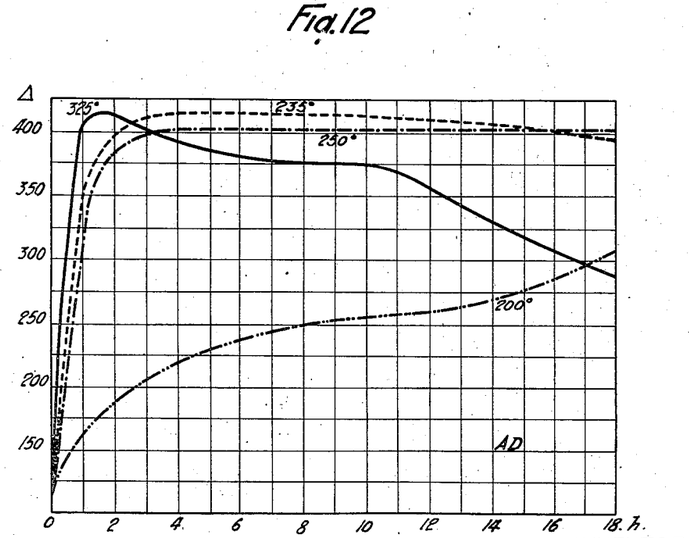
Figure 13:
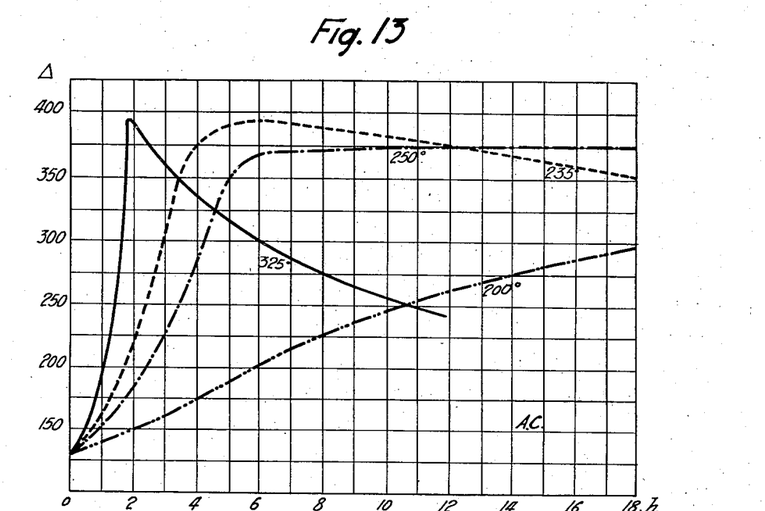

The curve in Figure 9 represents the variations, as a function of the temperature of annealing, in the hardness of the following alloy of copper-beryllium-vanadium, designated as normal alloy by the abbreviation "A. C." and comprising, with the addition of iron for increasing the fluidity in casting:

|  | Per cent |
|---|---|
| Beryllium | Between 1.3 and 1.5 |
| Vanadium | Between 0.35 and 0.5 |
| Iron | Between 3 and 4 |

The curves given in Figures 10, 11, 12 and 13 represent the variations in the hardness, as a function of the duration of annealing, respectively for each of the alloys defined above, designated by the abbreviations: alloy "A. T.," alloy "A. N.," alloy "A. D." and alloy "A. C."

Figure 14:
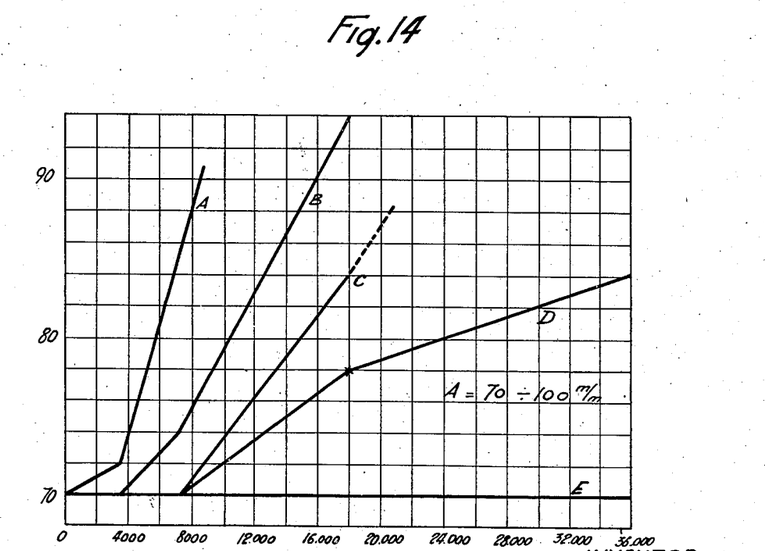
Figs. 14 and 15 are diagrams of the variations in the permanent elongations set up by means of comparative mechanical trials carried out on known alloys and on the alloys with copper as base according to the invention.
Figure 15:
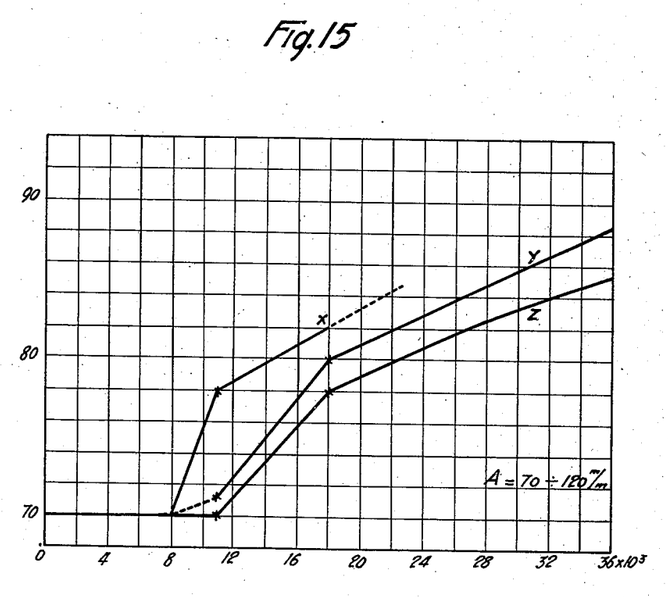

The curves given in Figures 14 and 15 represent the comparative variations in the permanent elongation set up by means of mechanical trials carried out on spindle springs (spiral springs) on the one hand made of wires of the aluminum-silicon alloy so-called in the trade "Alpax," brass, phosphor-bronze, semi-hard steel (Figure 14 A—B—C—D—E drawn down to 70 to 100 mm.) and on the other hand for analogous wires of springs in solubilised beryllium bronze, consisting of an alloy Cu-Be-Va of the type "A. N." in a usual beryllium bronze, consisting of a Cu-Be alloy with 2.07% of Be, and a "harmonic" or fine steel for strings of violins and pianos (Figure 15/X—Y—Z drawn down to 70 to 120 mm.).

What I claim is:

1. A copper alloy containing beryllium in the proportion of about 1.3 to 2.6% and as a solubilizing metal for berryllium, vanadium in the proportion of about 0.2 to 0.5%, the balance being substantially all copper.

2. A copper alloy containing beryllium in the proportion of about 1.3 to 2.6% and as a solubilizing metal for beryllium, vanadium in the proportion of about 0.2 to 0.5%, the balance being substantially all copper, the said alloy having been hardened by heating the alloy to a temperature of 765 to 795° C. during 15 to 30 minutes, then cooling the same rapidly and submitting it to an annealing operation at a temperature of 270 to 295° C. during two to six hours.

3. A copper alloy containing beryllium in the proportion of about 1.3 to 2.6% and titanium in the proportion of about 0.1 to less than 0.5%, the balance being substantially all copper.

4. A copper alloy containing beryllium in the proportion of about 1.3 to 2.6% and, as a solubilizing metal for the beryllium, titanium in the proportion of about 0.1 to less than 0.5%, the remainder being substantially all copper, the said alloy having been hardened by heating the alloy to a temperature of 765 to 795° C. during 15 to 30 minutes, then cooling the same rapidly and then submitting it to an annealing operation at a temperature of 270 to 295° C. during two to six hours.

CARLO ADAMOLI.